No. 768,629. PATENTED AUG. 30, 1904.
A. E. SCHUCHERT.
CUTTING MACHINE.
APPLICATION FILED DEC. 10, 1903.
NO MODEL.
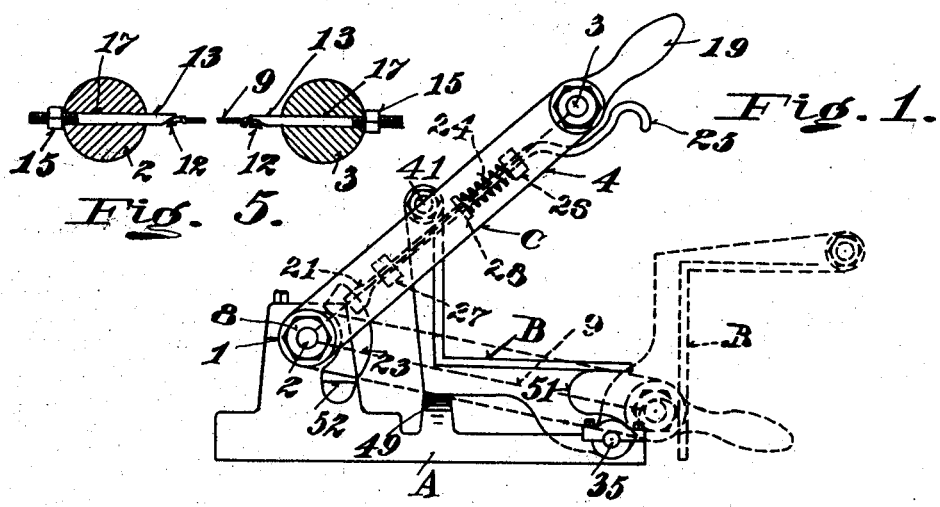
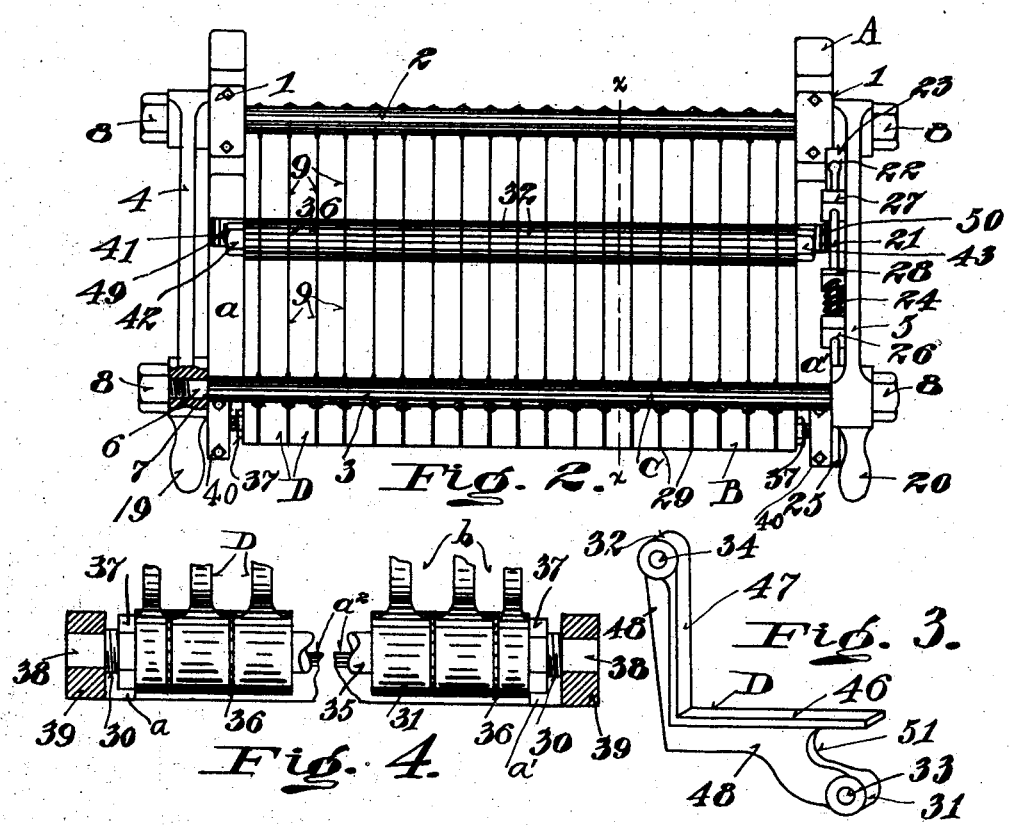
Witnesses.
Henry N. Baier
Herbert F. Harden
Inventor.
Albert E. Schuchert,
by his Attorney.

No. 768,629.

Patented August 30, 1904.

UNITED STATES PATENT OFFICE.

ALBERT E. SCHUCHERT, OF CINCINNATI, OHIO.

CUTTING-MACHINE.

SPECIFICATION forming part of Letters Patent No. 768,629, dated August 30, 1904.

Application filed December 10, 1903. Serial No. 184,517. (No model.)

*To all whom it may concern:*

Be it known that I, ALBERT E. SCHUCHERT, a citizen of the United States, residing at Cincinnati, in the county of Hamilton and State of Ohio, have invented certain new and useful Improvements in Cutting-Machines, of which the following is a specification.

My invention relates to cutting-machines especially applicable for cutting strips or bulks of soft material into sections, and is especially useful, for instance, for bakers, affording a labor-saving device whereby large numbers of sections of dough of predetermined size may be rapidly cut, as cutting out the sections of dough intended for pie-crusts or the like.

The invention will be readily understood from the following description and claims and from the drawings, in which latter—

Figure 1 is a side elevation of my improved device with the table and cutting-frame shown in full lines in normal position, the cutting-frame being also shown in depressed position and the table in tilted position in dotted lines. Fig. 2 is a plan view of my improved device, partly in section. Fig. 3 is a perspective view of one of the table-sections. Fig. 4 is a detail, partly in section, showing the means for connecting the table-sections for assembling the combined table. Fig. 5 is a detail in cross-section, showing the means for stretching or tautening the cutters; and Fig. 6 is a cross-section on the line $x\ x$ of Fig 2, showing the construction of the frame.

A represents the main frame, which may comprise the sides $a\ a'$ and the cross-girt $a^2$.

B is the table, and C the cutting-frame.

The main frame A has bearings 1 1, in which the cross-shaft 2 of the cutting-frame is journaled. The cutting-frame, in the form shown, comprises the cross-shaft 2, a cross-bar 3, and sides 4 5, connecting the cross-shaft and cross-bar. Each end of the cross-shaft and the cross-bar is reduced, as shown at 6, forming a shoulder 7, against which the side takes, a nut 8 screwing over the reduced end and clamping the side in place against the shoulder, forming a rigid construction for the cutting-frame. The cross-shaft and cross-bar are connected by a series of cutters 9 (shown as wires) and connected to hooks 12, presented downwardly on bolts 13 in the cross-shaft and cross-bar, respectively, nuts 15 taking over the threaded ends of the bolts and against the cross-shaft and cross-bar, respectively, for tautening the cutters. The bolts respectively slide in apertures 17 in the cross-shaft and cross-bar, respectively. The cutter-frame has handles 19 20 and is provided with a bolt 21, taking into an aperture 22 in the arc 23 on the frame for normally keeping the cutter-frame in raised position, a spring 24 urging the bolt normally into the aperture 22, a finger 25 being on the bolt for convenience in manipulating the bolt. The bolt slides in bearings 26 27 on one of the sides, the spring taking between one of the bearings and a collar 28 on the bolt.

The table B has a series of slots 29 side by side, into which the cutters 9 are adapted to take for cutting the material, the cutters passing through the material. The table is preferably composed of a number of sections D, each of which has hubs 31 32, respectively, having openings 33 34. A shaft 35 takes through the openings 33, with washers 36 taking between adjacent table-sections for separating the sections just sufficiently for providing the space or slots 29 between the edges of adjacent table-sections in which the cutters 9 may reciprocate. The shaft 35 is threaded adjacent to its ends, as shown at 30, nuts 37 taking over said ends and clamping the washers and table-sections together on the shaft. Each end of the shaft has a journal 38 journaled in a bearing 39 in the reduced forward end 40, at each side of the main frame, the shaft rocking in the bearing when the table is tilted. A rod 41 takes through the openings 34, washers similar to the washers 36 being placed between adjacent table-sections. The rod 41 may be in the form of a bolt with a nut 42 clamping the table-sections and washers between the head 43 of the bolt and the nut. In this manner a combined table of simple and cheap construction provided with the necessary slots for the cutters is formed and a table provided in which the width of the slots may be determined by the thickness of the washers used, dependent on the thickness of the wire or other cutter it is desired to employ, which in turn is dependent on the material to be cut.

Each table-section preferably comprises the hubs 31 32 and preferably a bed 46 and back 47, the bed and back being thin at their edges, the section being strengthened by webs 48. The bed and back of the table-sections being thin at their edges, it requires little traversing of the cutters at any given point across the same before the cutters have passed said edges, and they also present little side surface upon which any of the material being cut may cling. It also permits the cutting edges of the cutters to pass beyond the said edges of the table-slots when cutting the material, as indicated by the dotted line of the cutter shown in Fig. 1, and into the spaces $b$ between the webs, which spaces present clearance beyond the thin edges mentioned under the bed and to rear of the back for permitting such portions of the soft material operated on which may be removed by the action of the cutters to drop without clogging the cutter-slots. The frame is also preferably unobstructed under the table, the table normally resting on lugs 49 50, extending from the frame, the lugs preferably extending only under the end sections of the table for providing clearance under the table for convenience in removing the waste particles of material that may be forced through the spaces between adjacent cutters. As shown, the end sections of the table may be narrow for cutting off the butt, heel, or waste end of the material. The table-sections are provided with indentations 51, adapted to take over the cross-bar 3 when the cutter-frame is lowered and the table tilted for permitting the material which has been cut to drop therefrom onto a board or into a receptacle that may be provided for the purpose, the tilting of the table providing a convenient way for removing the cut material therefrom without the necessity of touching the material. When it is in its lowered position, the cutter-frame rests on a lug 52 on the main frame.

Having thus fully described my invention, what I claim as new, and desire to secure by Letters Patent, is—

1. In a cutting-machine, the combination of a table having a series of slots and clearance-spaces for said slots wider than said slots, under said slots, and a cutter-frame, with a series of cutters on said cutter-frame taking into said slots from above, said slots merging into said clearance-spaces.

2. In a cutting-machine, the combination of a table having a series of slots and clearance-spaces for said slots wider than said slots, under said slots, and a cutter-frame, with a series of cutters on said cutter-frame taking into said slots from above, constructed and arranged for permitting the cutting edges on said cutters to take through said slots and into said clearance-spaces under said slots, and means for adjustably tautening said cutters.

3. In a cutting-machine, the combination of a table-frame composed of a series of sections rigidly secured together, the adjacent edges of said sections being spaced apart to form a series of slots in the table-frame, means for securing said table-sections rigidly together for forming a rigid unitary table, a cutter-frame, and cutters therefor arranged to take into said slots so formed.

4. In a cutting-machine, the combination with the main frame, of a cutter-frame pivoted at the rear of the main frame, a series of cutters side by side in the cutter-frame, means for adjusting the several cutters, means for normally holding the cutter-frame in raised position, a table-frame pivoted at the front of the main frame having a series of slots side by side into which said cutters are adapted to take for cutting the material, said table-frame arranged to swing above said cutter-frame, substantially as described.

5. In a cutting-machine, the combination of a main frame, a table-frame hinged thereon and comprising a series of table-sections, washers for separating said table-sections thereby forming a series of slots in said table, means for clamping said table-sections and washers together for forming the table, and a cutter-frame and cutters thereon arranged to take into said slots for cutting the material.

6. In a cutting-machine, the combination with the main frame, of a table-frame comprising a series of sections, each having a bed and back, said table-sections having apertures at the top of the back and below the bed thereof, washers arranged between adjacent table-sections at said apertures, rods taking through said apertures and washers, means thereon for clamping the table-sections and washers together for forming the united table, said table-frame being pivoted on one of said rods to the main frame, a cutter-frame pivoted to the main frame, and a series of cutters on said cutter-frame passing through said slots, substantially as described.

7. In a cutting-machine, the combination with the main frame, of a table-frame comprising a series of sections each having a bed and back, said table-sections having apertures at the top of the back and below the bed thereof, washers arranged between adjacent table-sections at said apertures, rods taking through said apertures and washers, means thereon for clamping the table-sections and washers together for forming the united table, said table-frame being pivoted on one of said rods to the main frame, a cutter-frame pivoted to the main frame, a series of cutters on said cutter-frame passing through said slots, and means for adjustably tautening said cutters, substantially as described.

8. In a cutting-machine, the combination with the main frame, of a table-frame comprising a series of sections each having a bed and back, said table-sections having apertures at the top of the back and below the bed thereof, washers arranged between adjacent table-sections at said apertures, rods taking through said apertures, and washers and means for clamping the table-sections and washers together for forming the united table, said table-frame being pivoted on one of said rods to the main frame, a cutter-frame pivoted to the main frame, a series of cutters on said cutter-frame passing through said slots, and means for normally holding said cutter-frame in raised position, substantially as described.

9. In a cutting-machine, the combination with the main frame, of a table-frame comprising a series of sections each having a bed and back, said table-sections having apertures at the top of the back and below the bed thereof, washers arranged between adjacent table-sections at said apertures, rods taking through said apertures and washers and means for clamping the table-sections and washers together for forming the united table, said table-frame being pivoted on one of said rods to the main frame, a cutter-frame pivoted to the main frame, a series of cutters on said cutter-frame passing through said slots, means for adjustably tautening said cutters, and means for normally holding said cutter-frame in raised position, substantially as described.

10. In a cutting-machine, the combination of a table-frame composed of a series of sections arranged side by side and having thin adjacent edges, washers between sections for forming a series of slots in the table-frame, a cutter-frame, and a series of wires forming cutters thereon, constructed and arranged for passing said wires beyond the said edges of the table-sections when cutting the material, substantially as described.

In testimony whereof I have signed my name hereto in the presence of two subscribing witnesses.

ALBERT E. SCHUCHERT.

Witnesses:
 HENRY N. BAUER,
 HERBERT F. HARDEN.